US012721463B1

(12) United States Patent
He

(10) Patent No.: US 12,721,463 B1
(45) Date of Patent: Sep. 1, 2026

(54) LIGHTWEIGHT COMBINED DECORATIVE TREE WITH VARIABLE LIGHT EFFECTS

(71) Applicant: SHANGYOU JIAYI LIGHTING PRODUCT CO., LTD., Shangyou City (CN)

(72) Inventor: Yaowen He, Shangyou City (CN)

(73) Assignee: SHANGYOU JIAYI LIGHTING PRODUCT CO., LTD., Shangyou City (CN)

( * ) Notice: Subject to any disclaimer, the term of this patent is extended or adjusted under 35 U.S.C. 154(b) by 0 days.

(21) Appl. No.: 19/425,121

(22) Filed: Dec. 18, 2025

(30) Foreign Application Priority Data

Oct. 29, 2025 (CN) ........................ 202522292156.8

(51) Int. Cl.

| | |
|---|---|
| ***A47G 33/06*** | (2006.01) |
| ***F21V 23/02*** | (2006.01) |
| *F21W 121/04* | (2006.01) |
| *F21Y 115/10* | (2016.01) |

(52) U.S. Cl.
CPC .............. *A47G 33/06* (2013.01); *F21V 23/02* (2013.01); *F21W 2121/04* (2013.01); *F21Y 2115/10* (2016.08)

(58) Field of Classification Search
CPC . F21W 2121/04; F21Y 2115/10; A47G 33/06; F21V 23/02
See application file for complete search history.

(56) References Cited

U.S. PATENT DOCUMENTS 4,364,102 A * 12/1982 Huppert ................. A47G 33/06 362/191
8,454,187 B2 * 6/2013 Chen ......................... F21S 4/10 362/122
2002/0097573 A1 * 7/2002 Shen ......................... F21S 4/10 362/249.06

* cited by examiner

*Primary Examiner* — Robert J May
(74) *Attorney, Agent, or Firm* — AVEK IP, LLC

(57) ABSTRACT

Some embodiments of the disclosure provide a lightweight combined decorative tree with variable light effects. Some examples of the disclosure may show one or more of the following effects: in some examples, a plurality of light-emitting diode (LED) light strips may be bent respectively to form different shapes, such that a light-emitting device may easily achieve lighting effects such as flowing light, blooming light, surrounding light, and running horse light. In some other examples, a central tree trunk and a branch rod assembly may be freely disassembled and assembled, which is more suitable for forming a small decorative tree and convenient for placement in various scenarios such as indoor spaces and corridors.

10 Claims, 11 Drawing Sheets

LIGHTWEIGHT COMBINED DECORATIVE TREE WITH VARIABLE LIGHT EFFECTS

FIELD OF THE DISCLOSURE

The disclosure relates to the technical field of decorative luminaires and discloses a lightweight combined decorative tree with variable light effects.

BACKGROUND

With the diversification of festival decoration demands, conventional lighting fixtures can no longer meet people's pursuit of decorative effects. Decorative luminaires, particularly decorative luminaires for tree models or other three-dimensional models, usually use light strips as light-emitting elements. Most light strips in the prior art are flexible light strips, such as an LED decorative light strip disclosed in Chinese Patent No. CN220770982U. Although this type of decorative light strips can achieve basic lighting, it lacks interactivity. The light strips cannot maintain their shape independently and need to be fixed with tools such as adhesive tapes and ropes. In addition, conventional decorative luminaire models, such as Christmas trees, are typically assembled by large components, and the shapes and sizes can hardly be flexibly adjusted according to scenarios, such that these models are inconvenient to use. In view of this, the inventor has made a new invention.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the lightweight combined decorative tree with variable light effects provided by the disclosure includes a base, a power supply assembly capable of being electrically connected to an external power supply, and a central tree trunk mounted on the base, where the central tree trunk is provided with at least a plurality of layers of branch rod assemblies, and the branch rod assemblies are in pluggable connection with the central tree trunk; each of the branch rod assemblies includes at least one support rod, and a light-emitting device for generating light and shadow changes is connected to an extending end of the support rod; and the light-emitting device includes a plurality of light-emitting diode (LED) light strips, the LED light strips are capable of being independently or combinedly bent and deformed into characters or patterns, each of the LED light strips includes a plurality of LED light-emitting chips, and the LED light strips are electrically connected to the power supply assembly.

Further, each of the LED light strips includes a first wire and a second wire, and the plurality of LED light-emitting chips are connected in parallel between the first wire and the second wire.

Further, each of the LED light strips is formed by spirally winding the first wire and the second wire, and the plurality of LED light-emitting chips are connected in parallel between the first wire and the second wire.

Further, the plurality of LED light-emitting chips have a common end portion, at least a part of the common end portion in an axial direction is tightly fixed together, the extending end of the support rod is provided with an accommodating cavity, and the common end portion is fastened inside the accommodating cavity.

Further, the central tree trunk includes a first tree trunk, a second tree trunk, and a third tree trunk, a lower end of the first tree trunk is in pluggable connection to the base, the second tree trunk is in pluggable connection to the first tree trunk, and the third tree trunk is in pluggable connection to the second tree trunk.

Further, the central tree trunk includes a first tree trunk, a second tree trunk, and a third tree trunk, and the first tree trunk, the second tree trunk, and the third tree trunk are all centrally-through tree trunks.

Further, the central tree trunk is provided with a hollow branch fork portion, and the support rod is in pluggable connection to the branch fork portion.

Further, the power supply assembly is connected to a hierarchical parallel wire group and a single-layer parallel wire group connected to the hierarchical parallel wire group, and the single-layer parallel wire group is electrically connected in parallel to the light-emitting device.

Further, the power supply assembly is connected to a hierarchical parallel wire group and a single-layer parallel wire group connected to the hierarchical parallel wire group, the support rod is hollow, and the single-layer parallel wire group passes through the hollow support rod and is electrically connected to the light-emitting device.

Further, the power supply assembly is connected to a hierarchical parallel wire group and a single-layer parallel wire group connected to the hierarchical parallel wire group, and the lightweight combined decorative tree is further provided with a surrounding layer coating the support rod, and at least a part of the single-layer parallel wire group is located between the support rod and the surrounding layer.

Further, the base is provided with a support ring and a hollow support cylinder, a support frame is disposed between the support ring and the support cylinder, and the support frame fixes the support cylinder to enable a bottom of the support cylinder to be higher than the support ring, such that the wire of the power supply assembly passes through the support cylinder.

Further, the power supply assembly is provided with an electrical plug, an electrical signal conversion controller, and a hierarchical parallel wire group, and the hierarchical parallel wire group is electrically connected to the electrical signal conversion controller.

BRIEF DESCRIPTION OF THE DRAWINGS

Illustrative embodiments of the present disclosure are described in detail below with reference to the attached drawing figures.

Figure 1:
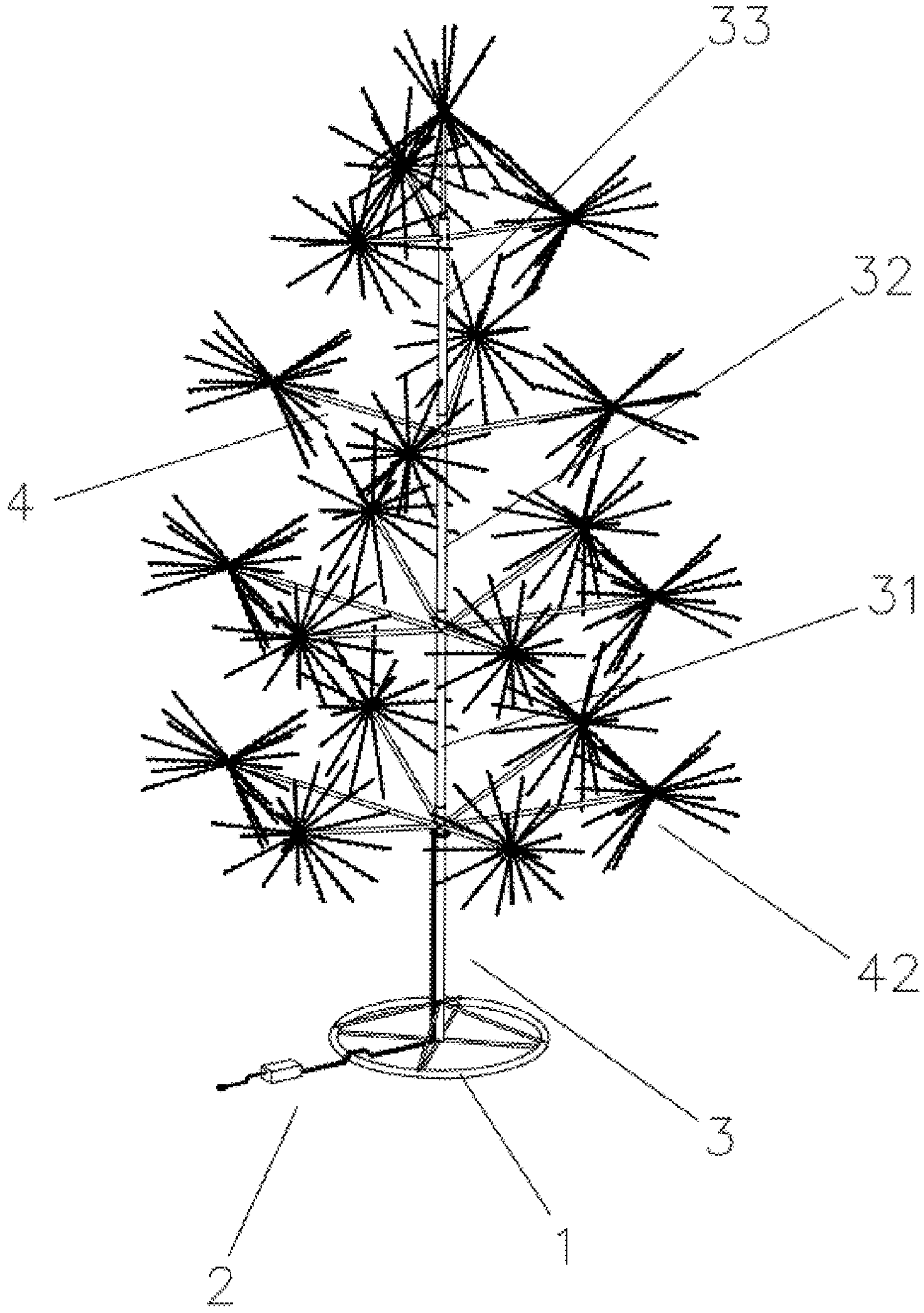
FIG. 1 shows a three-dimensional schematic diagram according to an embodiment of the disclosure.
Figure 2:
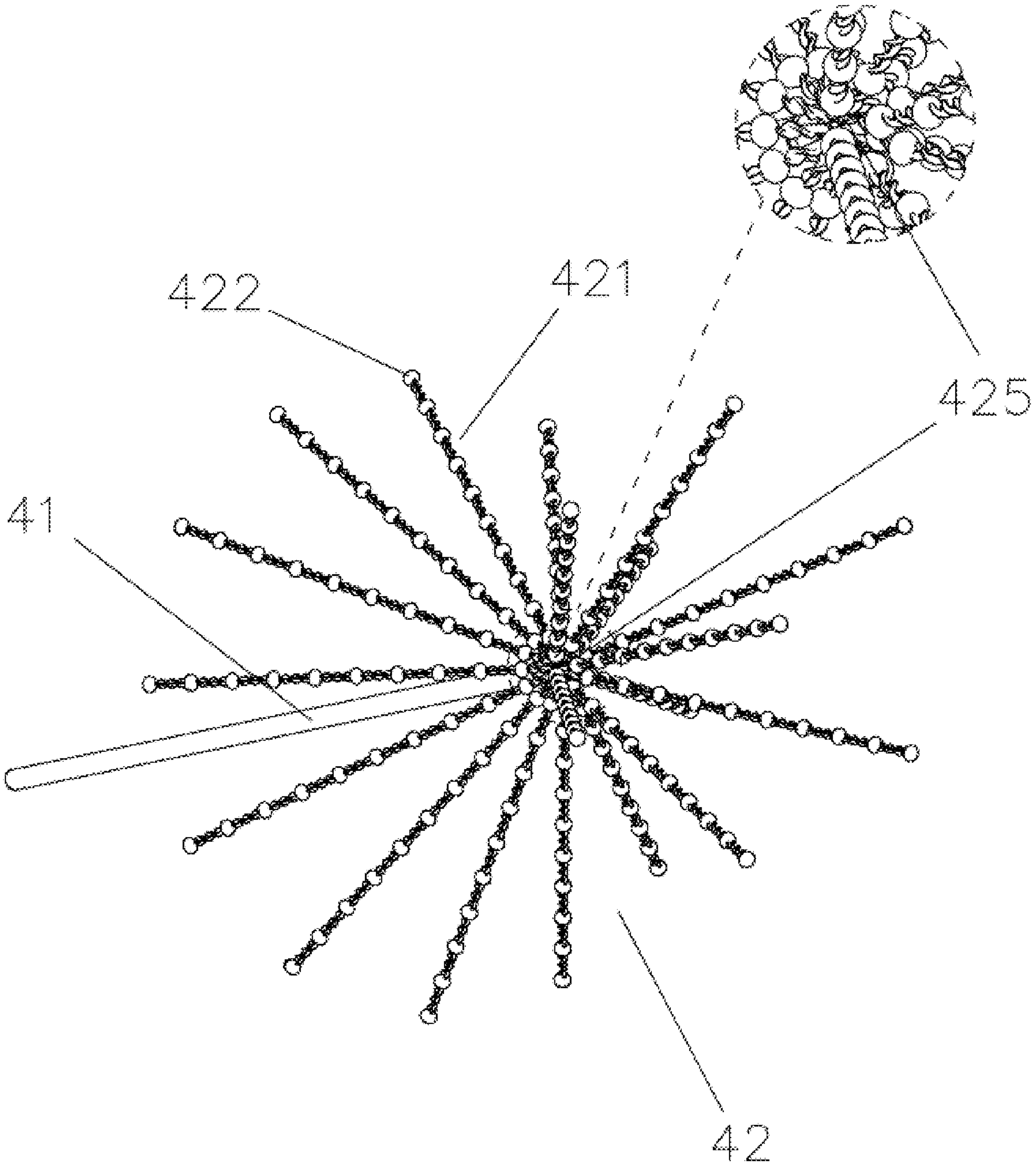
FIG. 2 shows a schematic structural diagram of a branch rod assembly according to an embodiment of the disclosure.
Figure 3A:
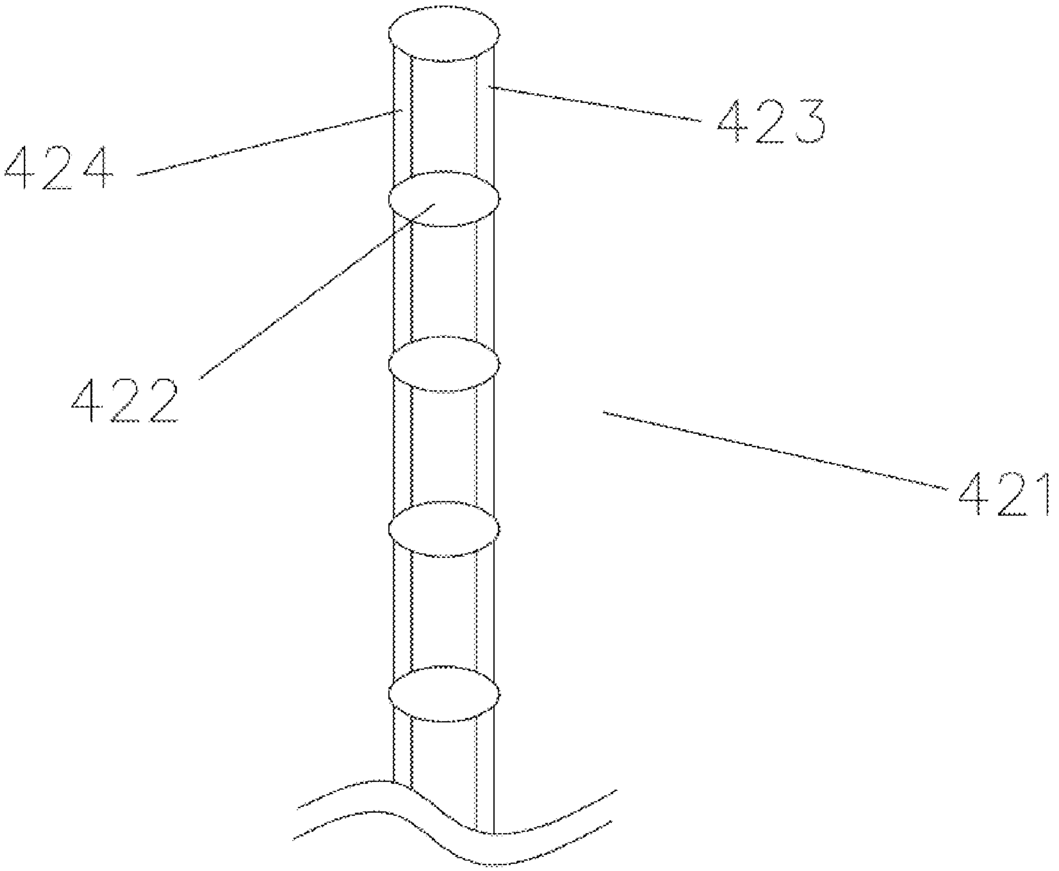
FIG. 3A shows a schematic structural diagram of an LED light strip and an LED core according to an embodiment of the disclosure.
Figure 3B:
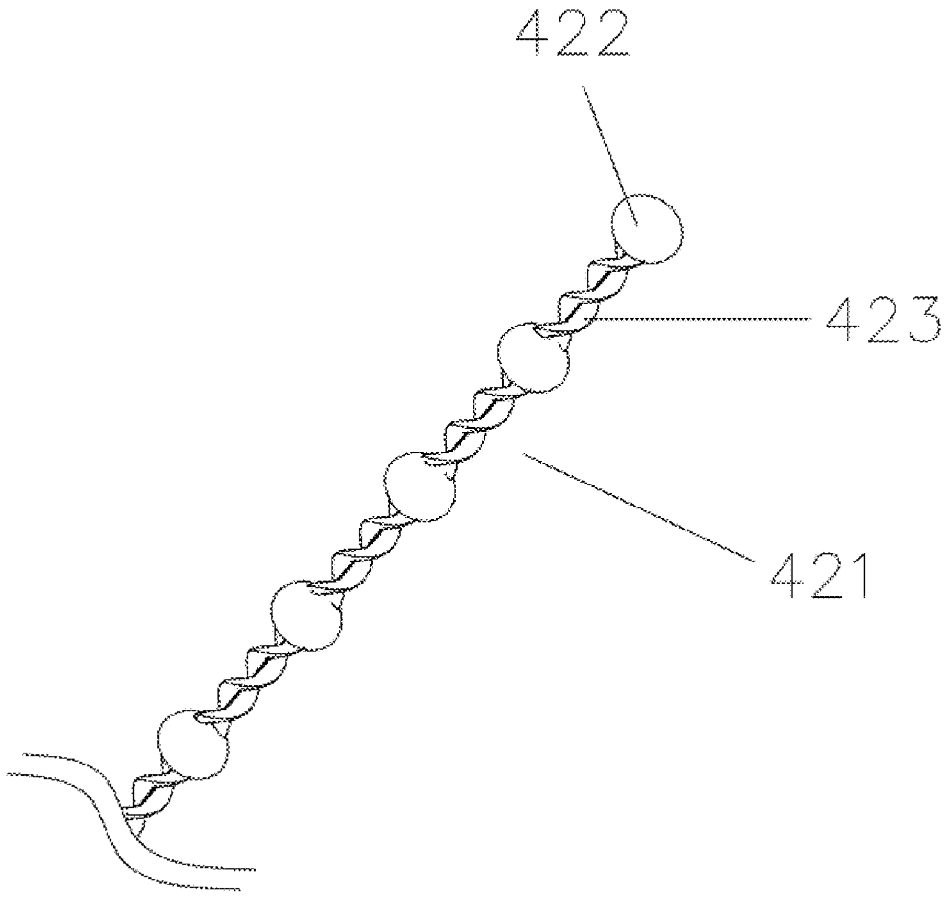
FIG. 3B shows a schematic structural diagram of an LED light strip formed by spirally winding a first wire and a second wire according to an embodiment of the disclosure.
Figure 4:
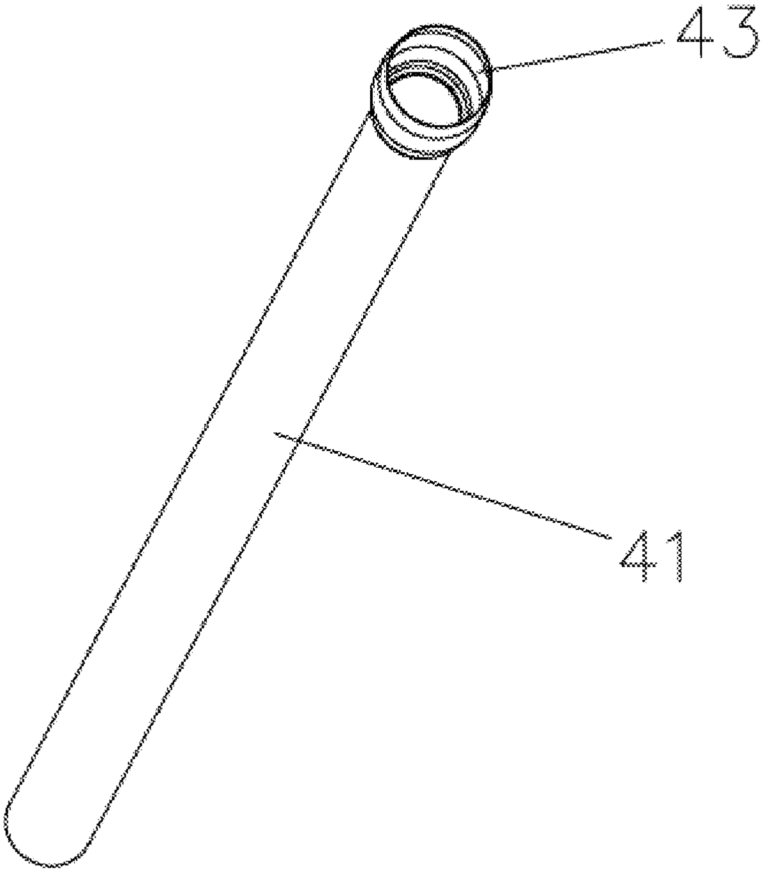
FIG. 4 shows a schematic structural diagram of a support rod according to an embodiment of the disclosure.

Reference numerals: 1, base; 11, support ring; 12, support cylinder; 13, support frame; 2, power supply assembly; 21, hierarchical parallel wire group; 22, single-layer parallel wire group; 23, electrical plug; 24, electrical signal conversion controller; 3, central tree trunk; 31, first tree trunk; 32, second tree trunk; 33, third tree trunk; 34, branch fork portion; 35, plug-in connection ring; 36, plug-in interface; 4, branch rod assembly; 41, support rod; 42, light-emitting device; 421, LED light strip; 422, LED light-emitting chip; 423, first wire; 424, second wire; 425, common end portion; 43, accommodating cavity; and 44, surrounding layer.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure will be described in detail below in conjunction with FIGS. 1-10.

A lightweight combined decorative tree with variable light effects provided by the disclosure may include a base 1. The base 1 has a certain counterweight. Optionally, the counterweight has a greater weight value than that of the central tree trunk 3, which ensures higher reliability during use and prevents the structure from toppling over easily. The lightweight combined decorative tree with variable light effects further may include a power supply assembly 2 capable of being connected to an external power supply, and a central tree trunk 3 mounted on the base 1. To form a tree-shaped structure, the central tree trunk 3 is provided with at least a plurality of layers of branch rod assemblies 4, and the branch rod assemblies 4 are in pluggable connection with the central tree trunk 3;

each of the branch rod assemblies 4 may include at least one support rod 41, and a light-emitting device 42 for generating light and shadow changes is connected to an extending end of the support rod 41; each layer of the branch rod assemblies 4 may use support rods 41 with different lengths; when combined, the higher the position, the shorter the length of the support rod 41, and the branch rod assembly 4 may be combined with the central tree trunk 3 to form a shape approximate to a Christmas tree; the lengths of the support rods 41 may also be the same, or the higher the position, the longer the length of the support rod; and the support rods may be freely combined and changed to form various shapes. It should also be emphasized that the term “Christmas tree” used in the disclosure does not limit its application to decoration only during Christmas festivals; apparently, it may also be used for decoration in other possible scenarios. Similarly, the shape formed by the combination of the central tree trunk and the support rod assembly of the disclosure is not limited to that of a “Christmas tree”.

The light-emitting device 42 may include a plurality of light-emitting diode (LED) light strips 421, the LED light strips 421 are capable of being independently or combinedly bent and deformed into characters or patterns, each of the LED light strips 421 may include a plurality of LED light-emitting chips 422, and a transparent polymer such as epoxy resin or gel covers the light-emitting chips 422, such that the LED light-emitting chips 422 form granular shapes, thereby achieving the optimal light-emitting effect, and the LED light strips 421 are electrically connected to the power supply assembly 2. The LED light-emitting chips 422 change in position with deformation of the LED light strips 421. The plurality of LED light strips 421 may be bent respectively to form different shapes, such that the light-emitting device 42 may easily achieve lighting effects such as flowing light, blooming light, surrounding light, and running horse light. Certainly, the single LED light strip 421 may also deform independently to form a letter, so as to form a letter or word with a light effect. Similarly, the LED light strips 421 may also be independently bent to form various concise patterns, such as light-emitting rings. A user may completely carry out DIY combined deformation of the single LED light strips or the plurality of LED light strips 421 according to own imagination. The power supply assembly 2 supplies power to the LED light strips 421, and the LED light-emitting chips 422 flash and emit light at a preset or self-set frequency by means of the control device. The light-emitting device 42 simulates blooming of fireworks through the light and shadow conversion effect generated by the sequential flashing of the LED light-emitting chips 422, resulting in high aesthetic appeal of the decorative luminaire. Certainly, since the light-emitting device 42 is provided with the plurality of LED light strips 421 and the plurality of LED light-emitting chips 422, the light effects such as mobile light and shadow, colorful light blooming, flashing and surrounding, running light, letters, and numbers may be easily achieved, such that the decorative effect is excellent.

Each of the LED light strips 421 may include a first wire 423 and a second wire 424, and the plurality of LED light-emitting chips are connected in parallel between the first wire 423 and the second wire 424. The first wire 423 and the second wire 424 has the characteristic of deformability by manual operation, and such deformation may still be naturally maintained after deformation. The first wire 423 and the second wire 424 each are composed of an insulating layer and an inner single metal wire and feature high plasticity. Corresponding LED light-emitting chips 422 may change in position with deformation of the LED light strips 421, such that the LED light strips 421 may be bent to a great extent. For example, the light-emitting device 42 simulates the firework blooming effect more perfectly.

Each of the LED light strips 421 is formed by spirally winding the first wire 423 and the second wire 424, and the plurality of LED light-emitting chips 422 are connected in parallel between the first wire 423 and the second wire 424. The first wire 423 and the second wire 424 has the characteristic of deformability by manual operation, and such deformation may still be naturally maintained after deformation. The first wire 423 and the second wire 424 each are composed of an insulating layer and an inner single metal wire and feature high plasticity. Corresponding LED light-emitting chips 422 may change in position with deformation of the LED light strips 421, such that the LED light strips 421 may be bent to a great extent. For example, the light-emitting device 42 simulates the firework blooming effect more perfectly. The first wire 423 and the second wire 424, which are spirally wound, have a stronger supporting force. In this structure, the LED light strips 421 may be longer, and the LED light strips 421 may be provided with more LED light-emitting chips.

The plurality of LED light-emitting strips 421 have a common end portion 425, at least a part of the common end portion 425 in an axial direction is tightly fixed together, the extending end of the support rod 41 is provided with an accommodating cavity 43, and the common end portion 425 is fastened inside the accommodating cavity 43. The plurality of LED light strips 421 and the LED light-emitting chips 422 distributed on the LED light strips 421 are combined to form the light-emitting device 42. The common end portion 425 is fastened inside the accommodating cavity 43, such that the light-emitting device 42 and the support rod 41 are connected and fixed, and the light-emitting device 42 is not prone to loosening and has high stability.

The central tree trunk 3 may include a first tree trunk 31, a second tree trunk 32, and a third tree trunk 33, a lower end of the first tree trunk 31 is in pluggable connection to the base 1, the second tree trunk 32 is in pluggable connection to the first tree trunk 31, and the third tree trunk 33 is in pluggable connection to the second tree trunk 32. The first tree trunk 31, the second tree trunk 32, and the third tree trunk 33 each are provided with at least one layer of branch rod assemblies 4, different numbers of branch rod assemblies 4 are disposed on the first tree trunk 31, the second tree trunk 32, and the third tree trunk 33, and the support rods 41 are also different in length. Specifically, the base 1, the central tree trunk 3, and the branch rod assemblies 4 are combined to form a lightweight combined decorative tree. The number of the branch rod assemblies 4 disposed on the first tree trunk 31 is greater than the number of branch rod assemblies 4 disposed on the second tree trunk 32, the number of the branch rod assemblies 4 disposed on the second tree trunk is greater than the number of branch rod assemblies 4 disposed on the third tree trunk 33, and the first tree trunk 31 and the second tree trunk 32 are not limited to one. The first tree trunk 31 is in pluggable connection above the base 1 or the first tree trunk 31, the second tree trunk is in pluggable connection above the first tree trunk 31 or the second tree trunk, and the third tree trunk 33 is in pluggable connection above the second tree trunk 32. The central tree trunk 3 may be formed by combining the base 1, one first tree trunk 31, one second tree trunk 32, and one third tree trunk 33, and the lightweight combined decorative tree under this combination is provided with three layers of tree trunks. The central tree trunk 3 may be formed by combining the base 1, two first tree trunks 31, one second tree trunk 32, and one third tree trunk 33, and the lightweight combined decorative tree under this combination is provided with four layers of tree trunks. By analogy, the higher the position, the smaller the length of the support rod 41. The plurality of layers of branch rod assemblies 4 and the central tree trunk 3 are combined to form the Christmas tree shape. The central tree trunk 3 and the branch rod assemblies 4 may be detached and assembled randomly to form various Christmas trees with different sizes and heights, which are suitable for various indoor and outdoor scenarios.

The central tree trunk 3 may include a first tree trunk 31, a second tree trunk 32, and a third tree trunk 33, and the first tree trunk 31, the second tree trunk 32, and the third tree trunk 33 are all centrally-through tree trunks. The first tree trunk 31, the second tree trunk 32, and the third tree trunk 33 each are of a shell structure with an interconnected cavity in the middle, with a low cost and small weight. The central tree trunk 3 combined is also conveniently carried and moved. The wire of the power supply assembly 2 may connect the branch rod assemblies 4 through the cavities of the first tree trunk 31, the second tree trunk, and the third tree trunk 33. The central tree trunk 3 is provided with a hollow branch fork portion 34, and the support rod 41 is in pluggable connection to the branch fork portion 34. A plurality of branch fork portions 34 are disposed, and each of the branch fork portions 34 is in pluggable connection to one support rod 41, such that the branch fork portion 34 is connected to one branch rod assembly 4. The wire of the power supply assembly 2 may pass through the branch fork portion 34 and be connected to the branch rod assembly 4. This method may hide the wire of the power supply assembly 2 and guide the wire layout, avoid wire tangling or interference with other branch rod assemblies 4, and improve the safety.

The power supply assembly 2 is connected to a hierarchical parallel wire group 21 and a single-layer parallel wire group 22 connected to the hierarchical parallel wire group 21, and the single-layer parallel wire group 22 is electrically connected in parallel to the light-emitting device 42. A plurality of single-layer parallel wire groups 22 are disposed, and each of the single-layer parallel wire groups 22 is electrically connected in parallel to the light-emitting device 42 on the single branch rod assembly 4. Specifically, the light-emitting device 42 is provided with a plurality of LED light strips 421, and each of the LED light strips 421 is electrically connected in parallel to the single-layer parallel wire group 22, such that other LED light strips are not affected after accidental disconnection of the wire connection of individual LED light strips 421, thereby improving the using stability of the light-emitting device 42. Similarly, each of the single-layer parallel wire groups 22 is electrically connected in parallel to the hierarchical parallel wire group 21. When one branch rod assembly 4 is detached, the light-emitting devices 42 of other branch rod assemblies 4 may still be electrically connected to the power supply assembly 2, and the branch rod assemblies 4 may be flexibly disassembled and assembled with high convenience.

The power supply assembly 2 is connected to a hierarchical parallel wire group 21 and a single-layer parallel wire group 22 connected to the hierarchical parallel wire group 21, the support rod 41 is hollow, and the single-layer parallel wire group 22 passes through the hollow support rod 41 and is electrically connected to the light-emitting device 42. The central tree trunk 3 is centrally through. The hierarchical parallel wire group 21 passes through the central position of the central tree trunk 3. The light-emitting device 42 is disposed on the end of the support rod 41. A tail end of the single-layer parallel wire group 22 passes through the middle of the support rod 41 and is electrically connected to the light-emitting device 42. Another tail end of the single-layer parallel wire group 22 passes through the branch fork portion 34, extends to the central portion of the central tree trunk 3 and is electrically connected to the hierarchical parallel wire group 21. In this structure, the hierarchical parallel wire group 21 and the single-layer parallel wire group 22 are both hidden in the central tree trunk 3 and the branch rod assembly 4, such that the lightweight combined decorative tree is neater and more aesthetically pleasing, and further has the function of preventing rainwater and dew.

Figure 5:
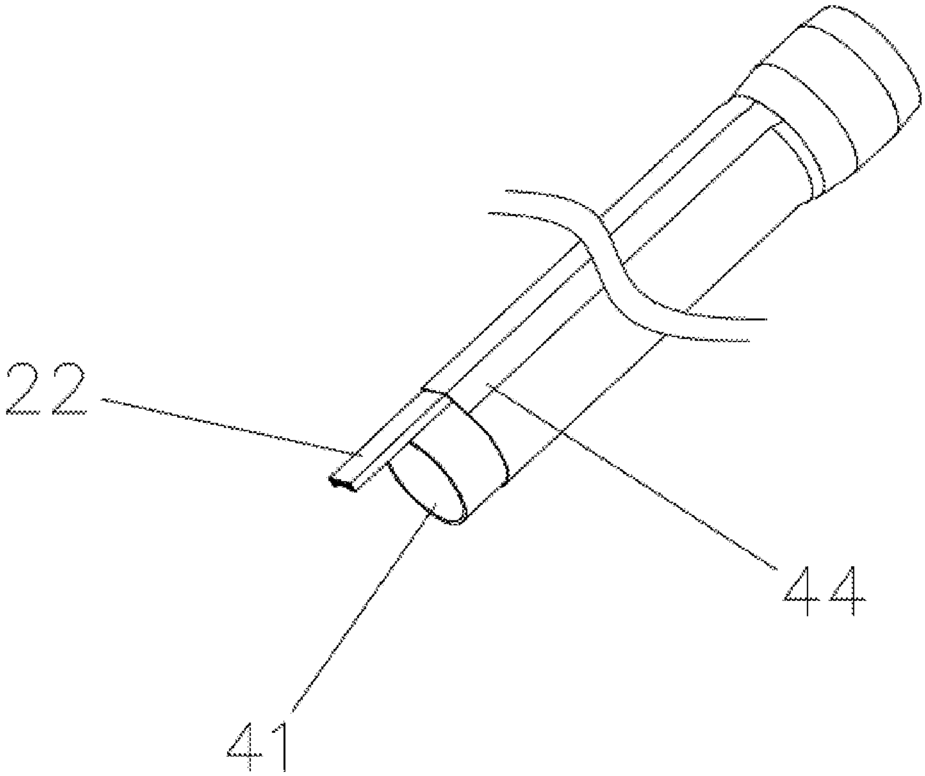
FIG. 5 shows a schematic structural diagram of a connecting structure of a support rod, a single-layer parallel wire group, and a surrounding layer according to an embodiment of the disclosure.
Figure 6:
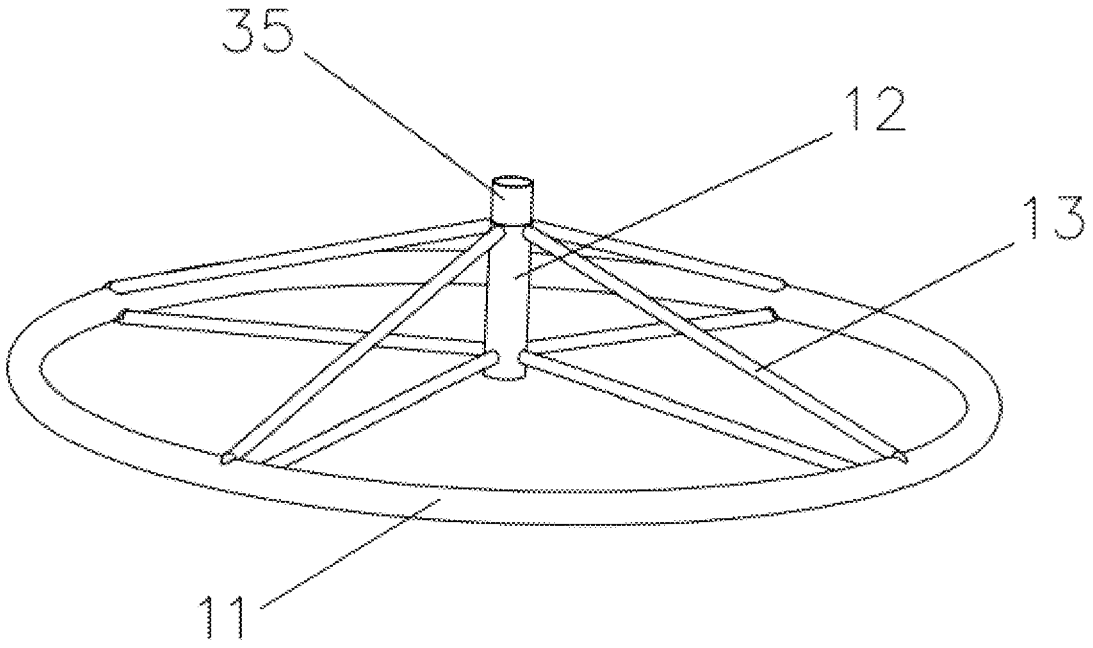
FIG. 6 shows a schematic structural diagram of a base according to an embodiment of the disclosure.
Figure 7:
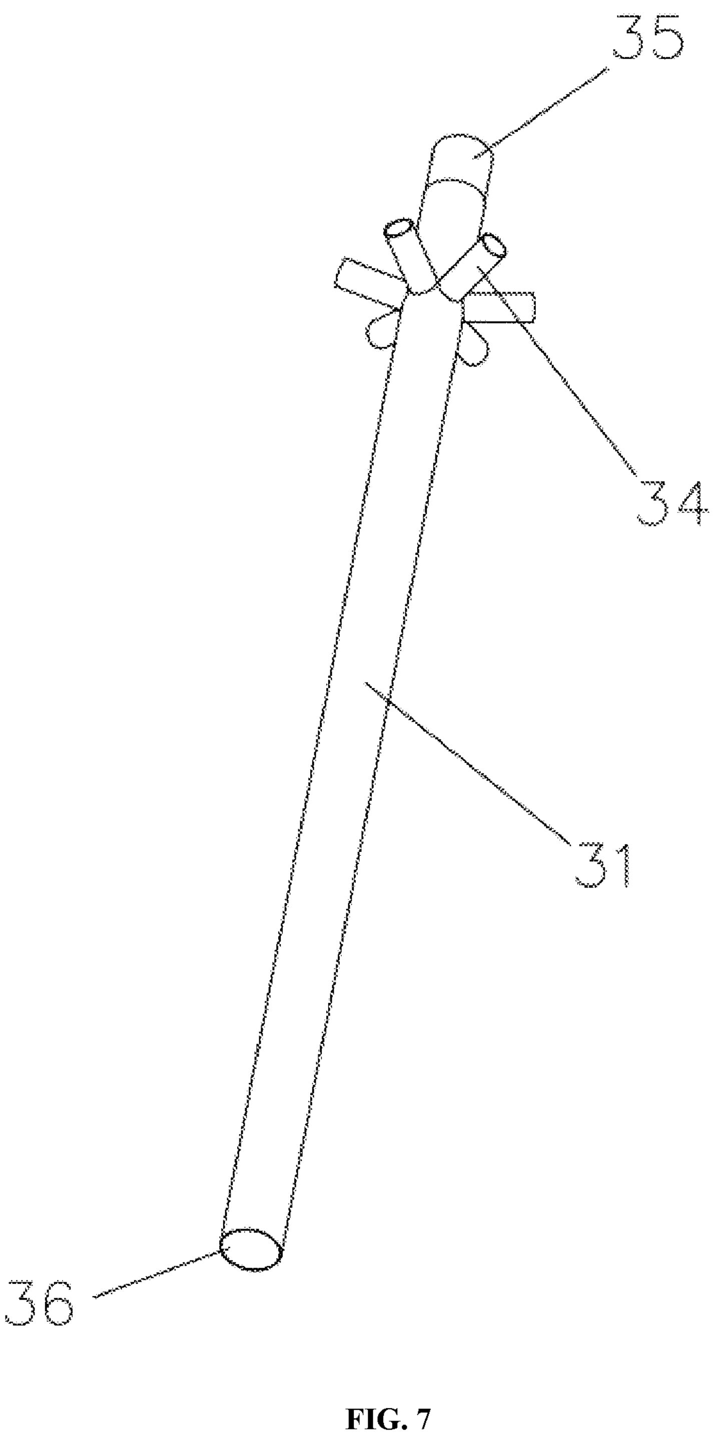
FIG. 7 shows a schematic structural diagram of a first tree trunk according to an embodiment of the disclosure.
Figure 8:
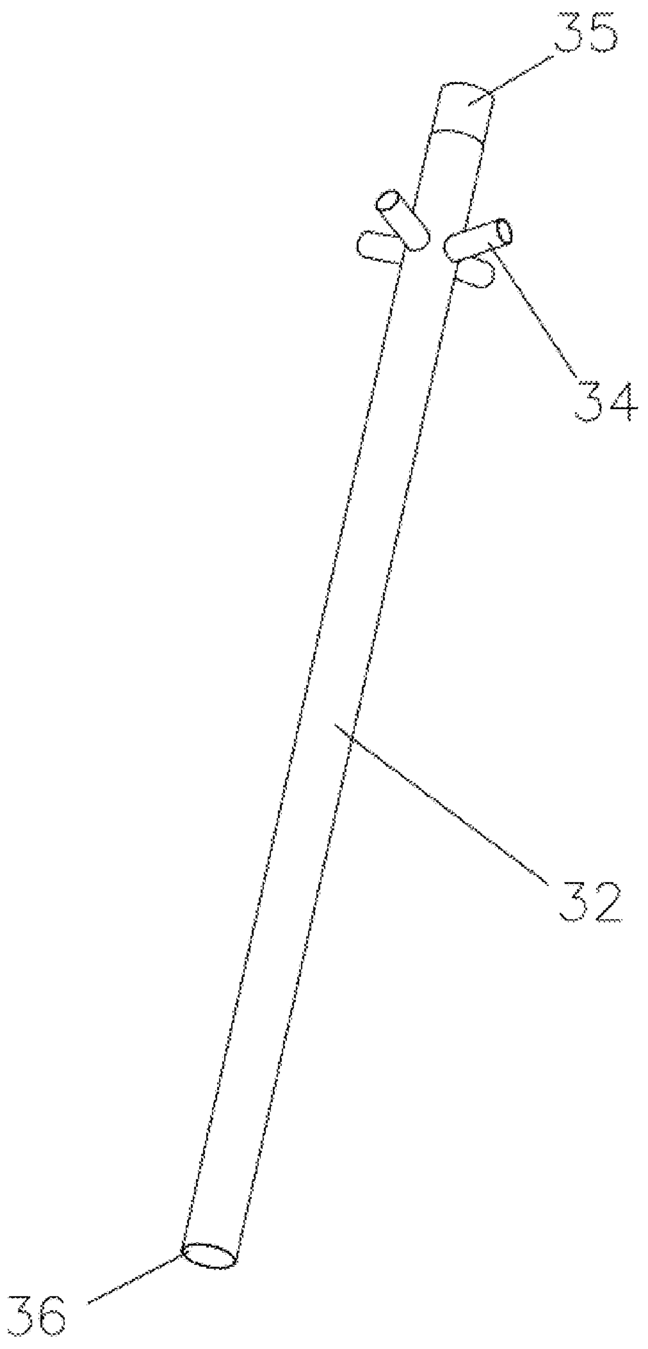
FIG. 8 shows a schematic structural diagram of a second tree trunk according to an embodiment of the disclosure.
Figure 9:
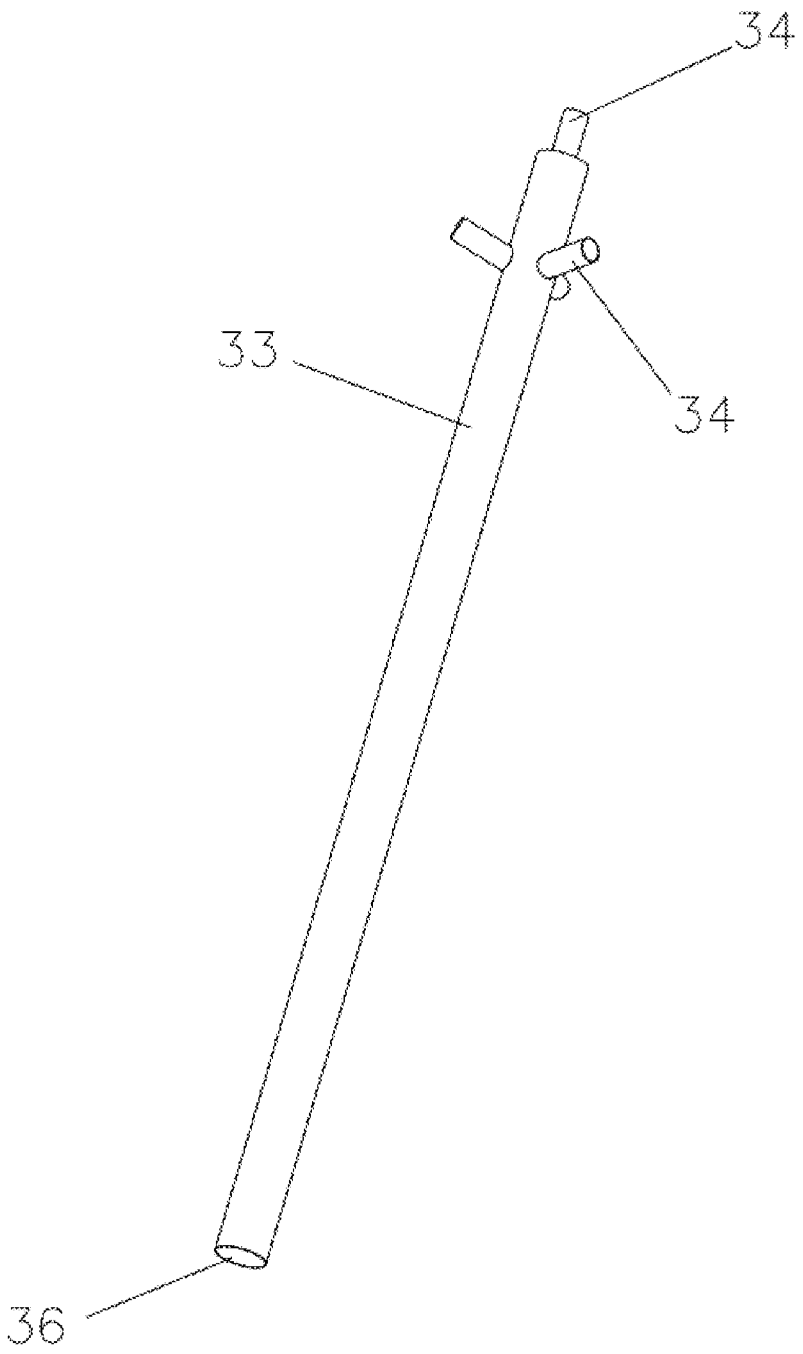
FIG. 9 shows a schematic structural diagram of a third tree trunk according to an embodiment of the disclosure.
Figure 10:
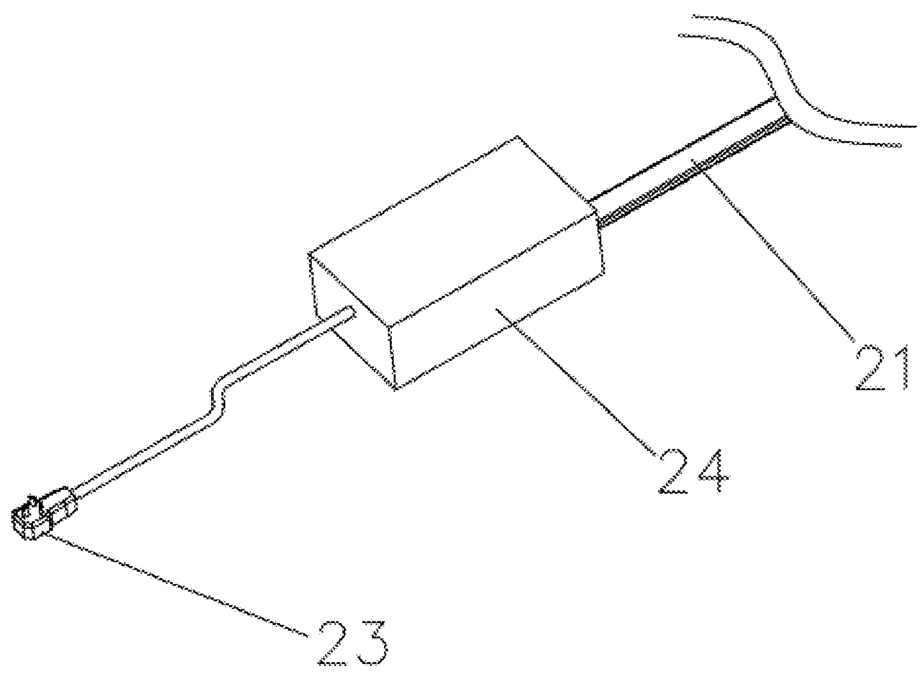
FIG. 10 shows a partial schematic structural diagram of a power supply assembly according to an embodiment of the disclosure.

As another embodiment, the power supply assembly 2 is connected to a hierarchical parallel wire group 21 and a single-layer parallel wire group 22 connected to the hierarchical parallel wire group 21, and the lightweight combined decorative tree is further provided with a surrounding layer 44 coating the support rod 41, and at least a part of the single-layer parallel wire group 22 is located between the support rod 41 and the surrounding layer 44. The hierarchical parallel wire group 21 and the single-layer parallel wire group 22 may also be disposed outside the central tree trunk 3 and the branch rod assembly 4. Referring to FIG. 5, a tail end of the single-layer parallel wire group 22 is electrically connected to the light-emitting device 42 at a tail end of the support rod 41, another tail end of the single-layer parallel wire group 22 extends toward another tail end of the support rod 41, coated by the surrounding layer 44, the single-layer parallel wire group 22 adheres to the outer surface of the support rod 41 and is fixed, an after the support rod 41 is plugged into the branch fork portion 34, the single-layer parallel wire group 22 is close to the central tree trunk 3 and is electrically connected to the hierarchical parallel wire group 21. The fixing mode and connecting structure of the hierarchical parallel wire group 21 and the single-layer parallel wire group 22 in this solution may further facilitate disassembly, assembly, and connection of the branch rod assembly 4. When the branch rod assembly 4 is assembled and connected, the single-layer parallel wire group 22 needs not to pass though the central tree trunk 3 and the support rod 41 again, making it more convenient for maintenance and replacement.

The base 1 is provided with a support ring 11 and a hollow support cylinder 12, a support frame 13 is disposed between the support ring 11 and the support cylinder 12, and the support frame 13 fixes the support cylinder 12 to enable a bottom of the support cylinder 12 to be higher than the support ring 11, such that the wire of the power supply assembly 2 passes through the support cylinder 12. The support ring 11 is a main support member for the base 1 to contact with the bottom surface, and the support ring 11 is optionally round, facilitating placement and direction adjustment. At least two groups of support frames 13 are symmetrically disposed, and the support frames 13 fix the support cylinder 12 above an axis of the support ring 11 and is configured to plug the central tree trunk 3. The central tree trunk 3 may include a first tree trunk 31, a second tree trunk 32, and a third tree trunk 33. The support cylinder 12 is provided with a plug-in connection ring 35. A tail end of the first tree trunk 31 is provided with a plug-in interface 36. The other tail end of the first tree trunk 31 is provided with a plug-in connection ring 35. A tail end of the second tree trunk 32 is provided with a plug-in interface 36. The other tail end of the second tree trunk 32 is provided with a plug-in connection ring 35. A tail end of the third tree trunk 33 is provided with a plug-in interface 36. The other tail end of the third tree trunk 33 is provided with a branch fork portion 34. The plug-in interface 36 may be in pluggable connection to the plug-in connection ring 35. When the lightweight combined decorative tree is assembled, the first tree trunk 31 is in pluggable connection to the support cylinder 12, the second tree trunk 32 is in pluggable connection to the first tree trunk 31, the third tree trunk 33 is in pluggable connection to the second tree trunk 32, and finally, the branch rod assembly 4 is in pluggable connection to the branch fork portion 34 at the tail end of the third tree trunk 33 as a top structure of the lightweight combined decorative tree. The wire of the power supply assembly 2 may enter the middle part of the central tree trunk 3 from the bottom of the support cylinder 12. For example, the hierarchical parallel wire group 21 passes through from the bottom of the support cylinder 12 and is electrically connected to the single-layer parallel wire group 22 passing through the branch fork portion 34 through the middle part of the central tree trunk 3. The support frame 13 fixes the support frame 12, such that the bottom of the support cylinder 12 is higher than the support ring 11, to prevent the base 1 from crushing the power supply assembly 2.

The power supply assembly 2 is provided with an electrical plug 23, an electrical signal conversion controller 24, and a hierarchical parallel wire group 21, and the hierarchical parallel wire group 21 is electrically connected to the electrical signal conversion controller 24. The electrical signal conversion controller 24 is provided with components such as a control chip and a signal converter, and the electrical signal conversion controller 24 may also be provided with an external control chip to control the light-emitting flashing frequency and light-emitting flashing color of the LED light-emitting chips 422, so as to achieve a light and shadow conversion effect satisfactory to the user. After the electrical plug 23 is plugged into a power supply such a socket, the electrical signal is output to the light-emitting device 42 through the hierarchical parallel wire group 21 and the single-layer parallel wire group 22 after being converted by the electrical signal conversion controller 24, such that the light-emitting device 42 is electrified.

Various embodiments of the disclosure may have one or more of the following effects. In some embodiments, the lightweight combined decorative tree with variable light effects provided by the disclosure may include the base, the power supply assembly, and the central tree trunk. The central tree trunk is provided with at least the plurality of layers of branch rod assemblies, each of the branch rod assemblies may include at least one support rod, and the light-emitting device for generating light and shadow changes is connected to the extending end of the support rod; and the light-emitting device may include the plurality of LED light strips, each of the LED light strips may include the plurality of LED light-emitting chips; and the disclosure has the following advantages: 1, the plurality of LED light strips may be bent respectively to form different shapes, such that the light-emitting device may easily achieve lighting effects such as flowing light, blooming light, surrounding light, and running horse light; and in other embodiments, the central tree trunk and the branch rod assembly may be freely disassembled and assembled, which is more suitable for forming a small decorative tree and convenient for placement in various scenarios such as indoor spaces and corridors. In further embodiments, aiming at deficiencies in the prior art, an objective of the disclosure may be to provide a lightweight combined decorative tree with variable light effects, which may have the advantages of freely changeable LED light strip shapes and modular assembly of tree trunks and branch rods.

The above content covers only various optional embodiments of the disclosure. For those of ordinary skill in the art, changes may be made in the specific implementation modes and application scopes according to the concept of the disclosure, and the content of this specification should not be construed as a limitation on the disclosure.

Many different arrangements of the various components depicted, as well as components not shown, are possible without departing from the spirit and scope of the disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A lightweight combined decorative tree with variable light effects, comprising a base (1), a power supply assembly (2) electrically connected to an external power supply, and a central tree trunk (3) mounted on the base (1), wherein:

the central tree trunk (3) is provided with at least a plurality of layers of branch rod assemblies (4), and the branch rod assemblies (4) are in a pluggable connection with the central tree trunk (3);

each of the branch rod assemblies (4) comprises at least one support rod (41), and a light-emitting device (42) for generating light and shadow changes is connected to an extending end of the support rod (41);

the light-emitting device (42) comprises a plurality of light-emitting diode (LED) light strips (421), the LED light strips (421) are independently or combinedly bent and deformed into characters or patterns, each of the LED light strips (421) comprises a plurality of LED light-emitting chips (422), and the LED light strips (421) are electrically connected to the power supply assembly (2);

the extending end of the support rod (41) is provided with an accommodating cavity (43);

the plurality of LED light-emitting strips (421) have common end portions (425); and at least a part of the common end portions (425) in an axial direction are tightly fixed together as a single connection part inside the accommodating cavity (43).

2. The lightweight combined decorative tree with variable light effects according to claim 1, wherein:

each of the LED light strips (421) comprises a first wire (423) and a second wire (424); and the plurality of LED light-emitting chips (422) are connected in parallel between the first wire (423) and the second wire (424).

3. The lightweight combined decorative tree with variable light effects according to claim 1, wherein:

the central tree trunk (3) comprises a first tree trunk (31), a second tree trunk (32), and a third tree trunk (33);

a lower end of the first tree trunk (31) is in pluggable connection to the base (1); and the second tree trunk (32) is in pluggable connection to the first tree trunk (31); and the third tree trunk (33) is in pluggable connection to the second tree trunk (32).

4. The lightweight combined decorative tree with variable light effects according to claim 1, wherein:

the central tree trunk (3) comprises a first tree trunk (31), a second tree trunk (32), and a third tree trunk (33); and the first tree trunk (31), the second tree trunk (32), and the third tree trunk (33) are all centrally-through tree trunks.

5. The lightweight combined decorative tree with variable light effects according to claim 1, wherein:

the central tree trunk (3) is provided with a hollow branch fork portion (34); and the support rod (41) is in pluggable connection to the branch fork portion (34).

6. The lightweight combined decorative tree with variable light effects according to claim 1, wherein:

the power supply assembly (2) is connected to a hierarchical parallel wire group (21) and a single-layer parallel wire group (22) connected to the hierarchical parallel wire group; and the single-layer parallel wire group (22) is electrically connected in parallel to the light-emitting device (42).

7. The lightweight combined decorative tree with variable light effects according to claim 1, wherein:

the power supply assembly (2) is connected to a hierarchical parallel wire group (21) and a single-layer parallel wire group (22) connected to the hierarchical parallel wire group;

the support rod (41) is hollow; and the single-layer parallel wire group (22) passes through the hollow support rod (41) and is electrically connected to the light-emitting device (42).

8. The lightweight combined decorative tree with variable light effects according to claim 1, wherein:

the power supply assembly (2) is connected to a hierarchical parallel wire group (21) and a single-layer parallel wire group (22) connected to the hierarchical parallel wire group;

the lightweight combined decorative tree is further provided with a surrounding layer (44) coating the support rod (41); and at least a part of the single-layer parallel wire group (22) is located between the support rod (41) and the surrounding layer (44).

9. The lightweight combined decorative tree with variable light effects according to claim 1, wherein:

the base (1) is provided with a support ring (11) and a hollow support cylinder (12);

a support frame (13) is disposed between the support ring (11) and the support cylinder (12); and the support frame (13) fixes the support cylinder (12) to enable a bottom of the support cylinder (12) to be higher than the support ring (11), such that a wire of the power supply assembly (2) passes through the support cylinder (12).

10. The lightweight combined decorative tree with variable light effects according to claim 1, wherein:

the power supply assembly (2) is provided with an electrical plug (23), an electrical signal conversion controller (24), and a hierarchical parallel wire group (21); and the hierarchical parallel wire group (21) is electrically connected to the electrical signal conversion controller (24).

* * * * *